Nov. 11, 1947.  L. OBOLER  2,430,824
FLASHLIGHT TYPE CIRCUIT TESTER
Filed Oct. 21, 1943  2 Sheets-Sheet 1
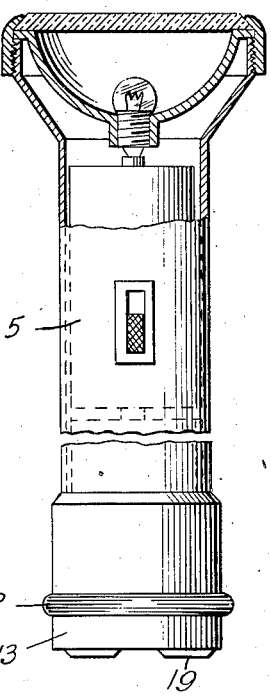
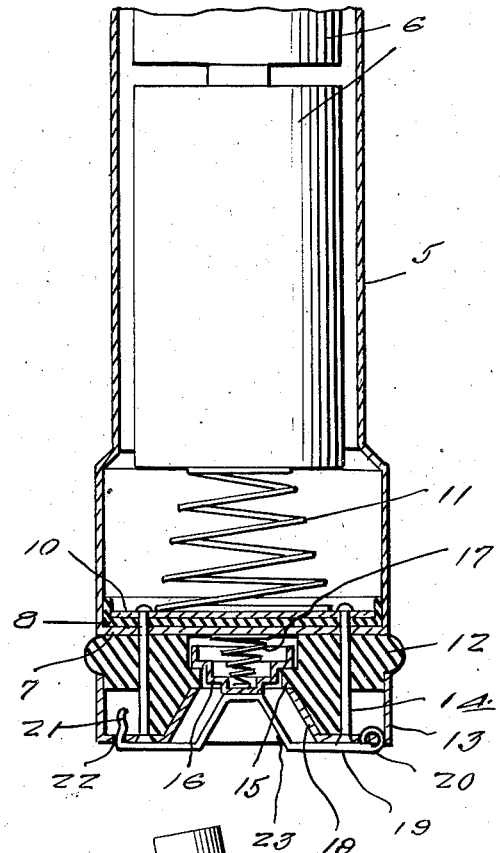
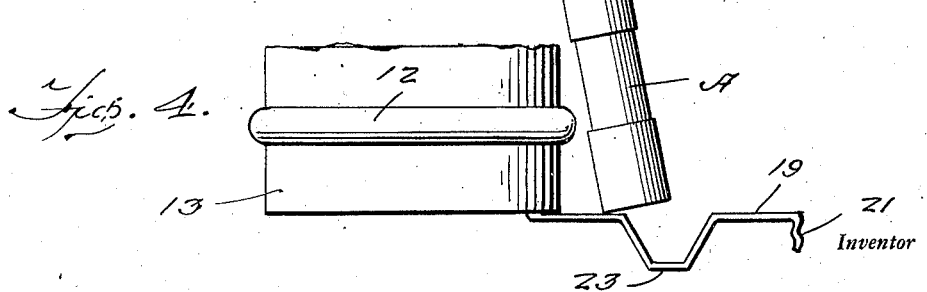
Inventor
LOUIS OBOLER
By *Clarence A. O'Brien and Harvey B. Jacobson*
Attorneys Nov. 11, 1947.  L. OBOLER  2,430,824
FLASHLIGHT TYPE CIRCUIT TESTER
Filed Oct. 21, 1943  2 Sheets-Sheet 2
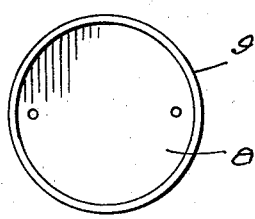
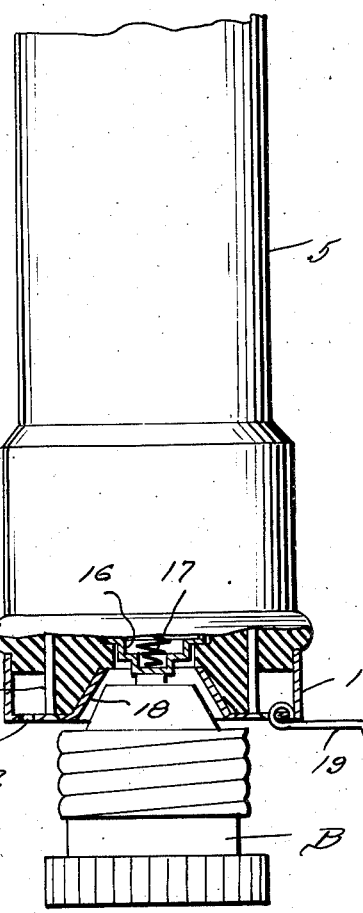
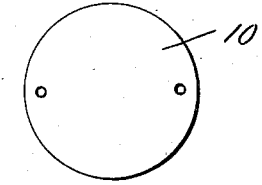
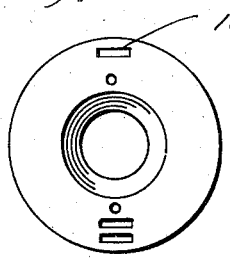
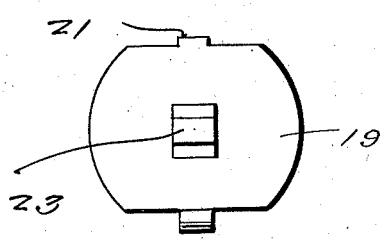
Inventor
LOUIS OBOLER
By Clarence A. O'Brien
and Harvey B. Jacobson
Attorneys Patented Nov. 11, 1947

2,430,824

UNITED STATES PATENT OFFICE 2,430,824

FLASHLIGHT TYPE CIRCUIT TESTER

Louis Oboler, Chicago, Ill.

Application October 21, 1943, Serial No. 507,195

2 Claims. (Cl. 175—183)

This invention relates to new and useful improvements in circuit testers especially adapted for testing various size fuses, lamps and other electrical elements.

The principal object of the present invention is to provide an electric circuit tester in the form of a self-contained indicating light which can be readily carried about and quickly used.

Another object of the invention is to provide a circuit testing device in the nature of a flashlight wherein the usual light of the flashlight can be used as an indicating light, indicating the condition of an electrical device being tested.

Other objects and advantages of the invention will become apparent to the reader of the following description.

In the drawings—

Figure 1 is a side elevational view of the tester partly broken away and shown in section.

Figure 2 is an enlarged vertical sectional view through the lower portion of the tester.

Figure 3 is a fragmentary side elevational view showing the pivotal connector in open position and a fuse being tested.

Figure 4 is a fragmentary side elevational view showing the connector in outwardly disposed position and an elongated fuse in the act of being tested.

Figure 5 is a top plan view of the flanged plate of insulation used inside of the tested case.

Figure 6 is a disk of current conductive material which seats in the plate 5.

Figure 7 is a bottom plan view of the rim which is attached to the insulation body on the bottom of the case.

Figure 8 is a top plan view of the connector which acts as a closure for the bottom of the tester.

Referring to the drawings wherein like numerals designate like parts, it can be seen that the numeral 5 denotes a case, which is in the nature of a flashlight case and contains batteries 6. The case 5 has a bottom 7 upon which is placed a plate 8 of insulation having a peripheral flange 9. Seated in this plate 8 is a disk 10 of current conductive material and interposed between this plate 10 and the opposed pole of the overlying batteries 6 is a compression spring 11.

Numeral 12 denotes a circular body of insulation having a hollow rim 13 disposed against the same. Tie bolts or rivets 14 serve to secure the rim 13, body 12 and case 5 together at the bottom 7, these rivets 14 extending through the bottom 7 and through the plate 8 and disk 10, as is clearly shown in Figure 2.

The central portion of the body 12 has an opening or pocket in which is a circumferential shoulder 15 against which a hollow contact button 16 is operative and a compression spring 17 interposed between this button and the bottom 7 of the case 5 serves to urge the button 16 downwardly against the shoulder 15.

The rim 13 has an inwardly disposed frustoconical shaped contact portion 18, against which the shell portion of a screw type fuse can engage as the center contact thereof pushes against the button 16.

Numeral 19 denotes a cover plate for the lower portion of the rim 13, this cover plate 19 being hinged as at 20 to the cover plate and provided with a spring finger 21 which is adapted to snap through an opening 22 in the rim 13 so that the cover plate will assume the position shown in Figure 2 when in closed position. This cover plate has a contact or riser 23 which engages the button as suggested in Figure 2 and thus it can be seen that when the device is to be used as a flashlight, the riser 23 engaging the button 16 will serve to complete the circuit between the opposite sides of the battery 6. In other words, current will then be permitted to pass from the battery 6 to the spring 11 and from there by way of the plate 10 to the pins 14 and from there to the rim 13 and the closure 19 and from there to the button 16 and the bottom 7 of the case 5.

As it would not be feasible to test elongated fuses A, such as is shown in Figure 4 in the same manner as screw type fuses B are tested, all that is required is to move the closure 19 outwardly as shown in Figure 4 and bridge the closure 9 with the case 5 through the medium of the fuse A, as is clearly shown. Thus elongated type fuses can be readily tested.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A device for testing electric fuses comprising a case of electrically conductive material having a closed bottom end, and an electric light in its opposite end in electrical connection with said case, a conductive disk in said bottom end insulated from said casing, a conductive spring in said case opposed to said disk, batteries in the case for energizing said light and having terminals one of which is connected with said light and the other being connected with said disk through said spring, contact elements at said bottom end of the case adapted to be bridged by a fuse to light said light comprising a rim insulated from said bottom end and having a conical seat for seating one end of the fuse, pins electrically connecting said disk and rim, a depressible spring pressed contact button normally extending into said seat for depression against said bottom end by the seated end of the fuse to establish an electrical connection between said seat and bottom end by way of said fuse.

2. A device for testing electric fuses comprising a case of electrically conductive material having a closed bottom end, and an electric light in its opposite end in electrical connection with said case, a conductive disk in said bottom end insulated from said casing, a conductive spring in said case opposed to said disk, batteries in the case for energizing said light and having terminals one of which is connected with said light and the other being connected with said disk through said spring, contact elements at said bottom end of the case adapted to be bridged by a fuse to light said light comprising a rim insulated from said bottom end and having a conical seat for seating one end of the fuse, pins electrically connecting said disk and rim, a depressible spring pressed contact button normally extending into said seat for depression against said bottom end by the seated end of said fuse to establish an electrical connection between said seat and bottom end by way of said fuse, and a contact element hinged to said rim for swinging across said seat to block insertion of a fuse into the seat, said element having a part for bridging said rim to said bottom end through said srping pressed contact button to thereby close a circuit to said light.

LOUIS OBOLER.

REFERENCES CITED

The following references are of record in the file of this patent:

UNITED STATES PATENTS

| Number | Name | Date |
|---|---|---|
| 1,696,266 | Coote | Dec. 25, 1928 |
| 1,723,750 | Shore | Aug. 6, 1929 |
| 2,174,484 | Wassel | Sept. 26, 1939 |
| 2,205,477 | James | June 25, 1940 |
| 2,292,730 | Zachae | Aug. 11, 1942 |